(12) United States Patent
Sekiguchi et al.

(10) Patent No.: US 7,245,427 B2
(45) Date of Patent: Jul. 17, 2007

(54) FRESNEL LENS SHEET HOLDING STRUCTURE AND REAR PROJECTION DISPLAY

(75) Inventors: Hiroshi Sekiguchi, Shinjuku-Ku (JP); Masahiro Goto, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 118 days.

(21) Appl. No.: 10/516,748

(22) PCT Filed: Mar. 18, 2004

(86) PCT No.: PCT/JP2004/003654

§ 371 (c)(1),
(2), (4) Date: Dec. 6, 2004

(87) PCT Pub. No.: WO2004/083956

PCT Pub. Date: Sep. 30, 2004

(65) Prior Publication Data

US 2005/0237610 A1    Oct. 27, 2005

(30) Foreign Application Priority Data

Mar. 20, 2003   (JP) .............................. 2003-077813

(51) Int. Cl.
*G03B 21/56* (2006.01)
(52) U.S. Cl. .................. 359/443; 359/457; 359/460
(58) Field of Classification Search ................ 359/443, 359/449, 460, 457
See application file for complete search history.

(56) References Cited

U.S. PATENT DOCUMENTS

| | | | | | |
|---|---|---|---|---|---|
| 4,550,977 | A | * | 11/1985 | Inoue et al. | 359/457 |
| 5,914,809 | A | * | 6/1999 | Mitani et al. | 359/457 |
| 6,307,675 | B1 | * | 10/2001 | Abe et al. | 359/457 |
| 6,348,993 | B1 | * | 2/2002 | Hori | 359/460 |
| 6,961,176 | B2 | * | 11/2005 | Sekiguchi | 359/460 |

FOREIGN PATENT DOCUMENTS

| | | |
|---|---|---|
| JP | 1-302338 | 12/1989 |
| JP | 7-043835 | 2/1995 |
| JP | 7-43713 | 10/1995 |
| JP | 2001-086701 | 3/2001 |
| JP | 2001-228546 | 8/2001 |
| JP | 2002-196413 | 7/2002 |

* cited by examiner

*Primary Examiner*—Rodney Fuller
*Assistant Examiner*—Robert Do
(74) *Attorney, Agent, or Firm*—Oliff & Berridge, PLC

(57) ABSTRACT

A Fresnel lens sheet holding structure holds a thin Fresnel lens sheet formed on a forming mold easily releasable from the forming mold in a satisfactory planarity on a rear projection display. A rear projection display is provided with the Fresnel lens sheet holding structure. The Fresnel lens sheet holding structure holds a Fresnel lens sheet of 3 mm or below in thickness having an entrance surface provided with prisms of a triangular cross section each having an entrance facet and a total-reflection facet that reflects part or all of light fallen on the entrance facet in a total-reflection mode to deflect the light in a desired direction. The Fresnel lens sheet holding structure includes a hanging member to be attached to the upper side of the Fresnel lens sheet, and a support member for supporting the hanging member. Preferably, a tensioning member is attached to the Fresnel lens sheet.

9 Claims, 19 Drawing Sheets

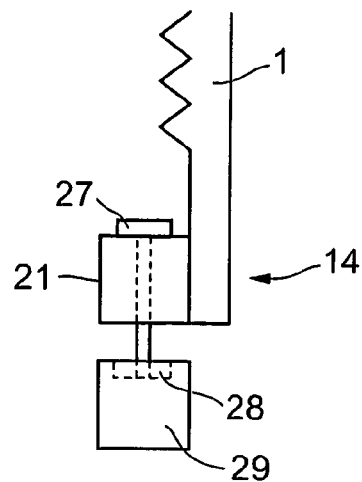
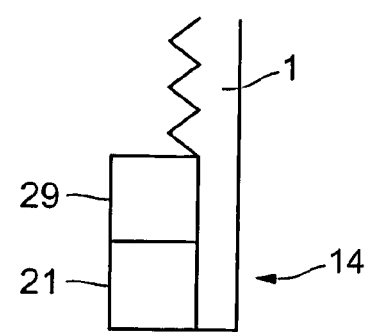
FIG. 12(a)   FIG. 12(b)
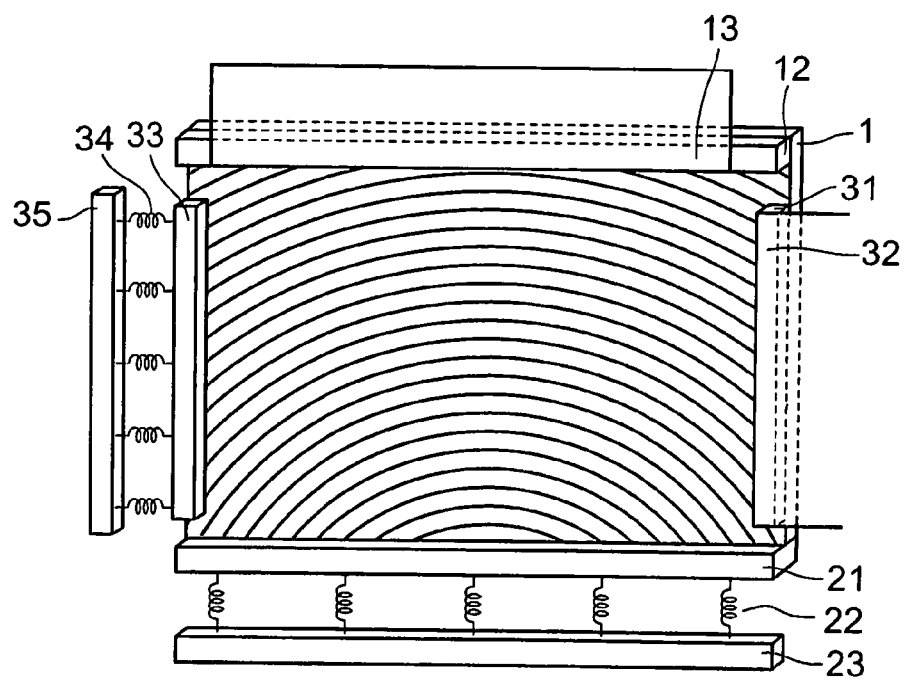
FIG. 13

FRESNEL LENS SHEET HOLDING STRUCTURE AND REAR PROJECTION DISPLAY

BACKGROUND OF THE INVENTION

1. Technical Field

The present invention relates to a Fresnel lens sheet holding structure and a rear projection display. More specifically, the present invention relates to a Fresnel lens sheet holding structure capable of holding a thin Fresnel lens sheet in a satisfactorily plane shape, and a rear projection display provided with the Fresnel lens sheet holding structure.

2. Background Art

FIG. 24 shows a rear projection display 101 by way of example. The rear projection display 101 projects imaging light 102 obliquely on a screen 103. FIG. 26 shows a Fresnel lens sheet 111 proposed in Patent document 1 to be employed in the rear projection display 101. The Fresnel lens sheet 111 is provided with total-reflection Fresnel lens elements 112 arranged on its entrance surface. Each of the Fresnel lens elements 112 is a prism 112 having a triangular cross section. The prism 112 has an entrance facet 113, and a total-reflection facet 114 that reflects all or part of light 102 fallen on the entrance facet 113 in a total-reflection mode to deflect the light 102 in a desired direction.

The total-reflection Fresnel lens sheet is formed by applying a molding resin to a flat forming mold 7, curing the molding resin applied to the forming mold 7 to form the Fresnel lens sheet 1, and releasing the Fresnel lens sheet 1 from the forming mold 7. Since the Fresnel lens elements 2 are engaged with the forming mold 7, it is difficult to release the Fresnel lens sheet 1 from the forming mold 7 when the Fresnel lens sheet 1 is thick because the thick Fresnel lens sheet 1 is has low flexibility. Therefore, the Fresnel lens sheet 1 is formed in a thickness of 3 mm or below to achieve mold releasing work efficiently.

References cited
Patent document 1: JP 61-208041 A
Patent document 2: JP 4-249235 A
Patent document 3: JP 4-256941 A

DISCLOSURE OF THE INVENTION

In a rear projection display 101 (FIG. 24) that projects the image light 102 obliquely on the transmission screen 103 provided with such a thin Fresnel lens sheet, the Fresnel lens sheet moves toward or away from a light source 108, i.e., the Fresnel lens sheet moves in a direction along its thickness, as shown in FIG. 25 if the transmission screen 103 is distorted due to, for example, the warping of the Fresnel lens sheet. Consequently, the height of a part of an image on a central part of the Fresnel lens sheet 111 changes as illustrated in FIG. 25. On the other hand, the position of a peripheral part of the Fresnel lens sheet 111 changes scarcely because the peripheral part of the Fresnel lens sheet 111 is held by a frame. Therefore, if the Fresnel lens sheet 111 warps, an image displayed on the transmission screen is distorted because a central part of the Fresnel lens sheet shifts in a direction along its thickness and the peripheral part of the Fresnel lens sheet shifts scarcely. For example, in some cases, an image of a horizontal straight line appears in a curved line curving with respect to a horizontal direction.

Particularly, a thin Fresnel lens sheet formed in a small thickness to facilitate mold releasing work and employed in a rear projection display is liable to warp and, consequently, images displayed by the rear projection display are liable to be distorted. Transmission screen holding structures disclosed in Patent documents 2 and 3 are not intended to be applied to a thin Fresnel lens sheet provided with total-reflection Fresnel lens elements.

The present invention has been made to solve the foregoing problems and it is therefore an object of the present invention to provide a Fresnel lens sheet holding structure capable of holding a thin Fresnel lens sheet that can be easily released from a forming mold in a satisfactorily plane shape on a rear projection display, and a rear projection display provided with the Fresnel lens sheet holding structure.

A Fresnel lens sheet holding structure according to the present invention for holding a Fresnel lens sheet of 3 mm or below in thickness having an entrance surface provided with prisms of a triangular cross section each having an entrance facet and a total-reflection facet that reflects part or all of light fallen on the entrance facet in a total-reflection mode to deflect the light in a desired direction are arranged includes a hanging member to be attached to the upper side of the Fresnel lens sheet, and a support member for supporting the hanging member.

A Fresnel lens sheet of 3 mm or below in thickness held by the Fresnel lens sheet holding structure of the present invention including the hanging member attached to the upper side of the Fresnel lens sheet and the support member supporting the hanging member is resistant to warping and is kept in a plane shape. Consequently, images displayed by the rear projection display provided with the Fresnel lens sheet are scarcely distorted.

In the Fresnel lens sheet holding structure of the present invention, it is preferable that a tensioning member is attached at least the lower side of the Fresnel lens sheet. Preferably (i) the tensioning member is pulled downward or laterally by an elastic member or (ii) a rigid sheet disposed adjacently to the exit surface of the Fresnel lens sheet is mounted on the tensioning member.

According to the present invention, the tensioning member attached to the Fresnel lens sheet pulls the Fresnel lens sheet downward or laterally, the thin Fresnel lens sheet of 3 mm or below in thickness can be kept in a plane shape.

When the Fresnel lens sheet holding structure has the construction mentioned in (ii), it is preferable that joining planes in which the lower surfaces of parts of the hanging member corresponding to right and left end parts of the upper side of the Fresnel lens sheet and the upper surfaces of right and left end parts of the support member are joined are inclined such that a point specified by coordinates on the side of the end of the Fresnel lens sheet on the joining plane is at a level lower than that of a point specified by coordinates on the side of the center of the Fresnel lens sheet on the joining plane in a front elevation, and joining planes in which the upper surfaces of parts of the tensioning member corresponding to right and left end parts of the lower side of the Fresnel lens sheet and the lower surfaces of parts of the rigid sheet mounted on the tensioning member corresponding to the right and the left end part are joined are inclined such that a point specified by coordinates on the side of end of the. Fresnel lens sheet on the joining plane is at a level higher than that of a point specified by coordinates on the side of the center of the Fresnel lens sheet on the joining plane in a front elevation.

Thus, according to the present invention, vertically stretching forces and horizontally stretching forces can be applied to the Fresnel lens sheet.

Preferably, the rigid sheet is a lenticular lens sheet.

In the Fresnel lens sheet holding structure according to the present invention, it is preferable that (a) the Fresnel lens sheet has an exit surface provided with diffusing lenticular lenses, (b) the Fresnel lens sheet contains a dispersing agent that diffuses light, (c) the Fresnel lens sheet is colored to absorb light or (d) the Fresnel lens sheet has a light absorbing layer.

In the Fresnel lens sheet holding structure according to the present invention, it is preferable that a low-reflection layer is formed on one of or both the surfaces of the Fresnel lens sheet.

A rear projection display according to the present invention is provided with a transmission screen including the foregoing Fresnel lens sheet holding structure.

BRIEF DESCRIPTION OF THE DRAWINGS

FIG. 12 is a view of an example of a holding structure not using any elastic members;

FIG. 13 is a view of a mode of tensioning a Fresnel lens sheet vertically and horizontally;

BEST MODE FOR CARRYING OUT THE INVENTION

A Fresnel lens sheet holding structure and a rear projection display according to the present invention will be described with reference to the accompanying drawings.

Thin Fresnel Lens Sheet

A thin Fresnel lens sheet to be held by a holding structure according to the present invention will be described.

Figure 1:
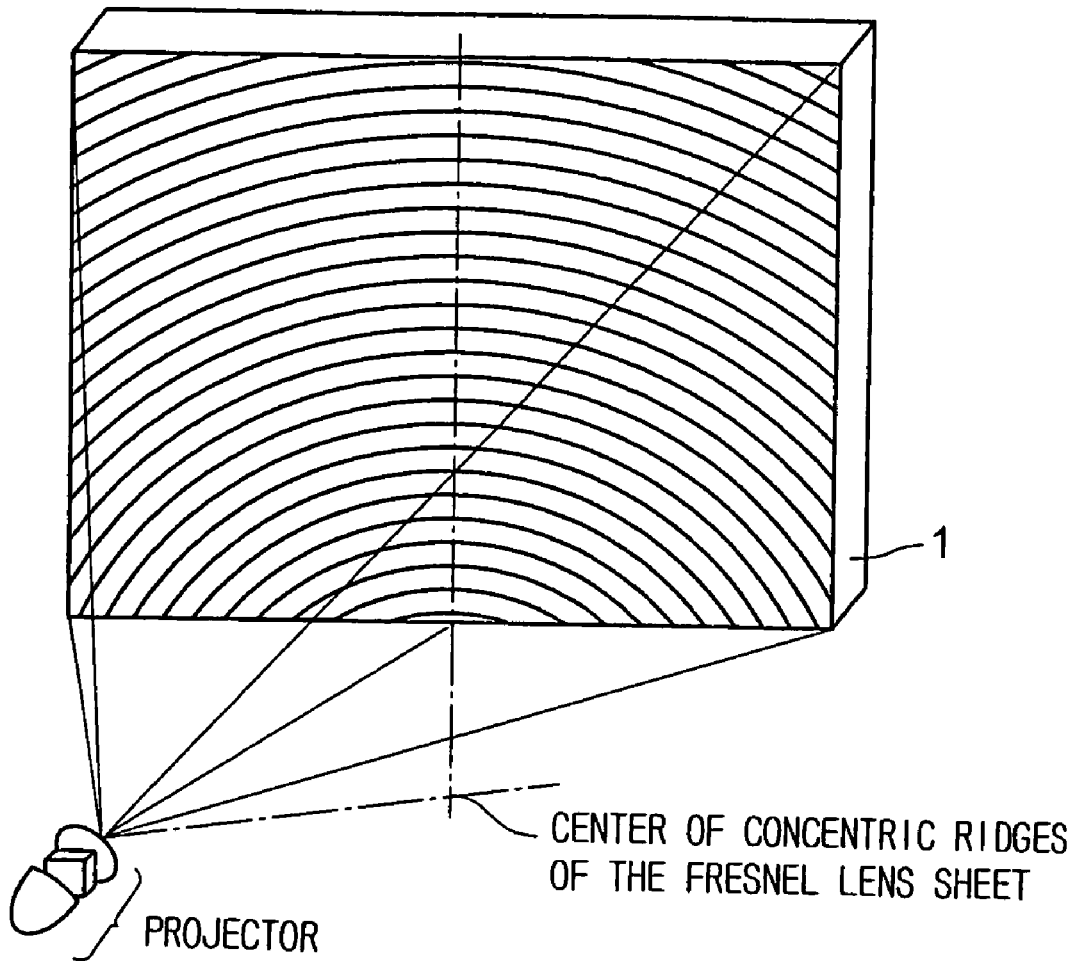
FIG. 1 is a view of an example of a Fresnel lens sheet for an oblique projection optical system to which a Fresnel lens sheet holding structure according to the present invention is applied.

FIG. 1 shows a Fresnel lens sheet 1 to be held by a Fresnel lens sheet holding structure according to the present invention for an oblique projection optical system by way of example. Since the center of concentric ridges of the Fresnel lens sheet 1 is not on the Fresnel lens sheet 1, light rays fall on any part on the Fresnel lens sheet at an incidence angle (about 70° at the maximum).

Figure 2:
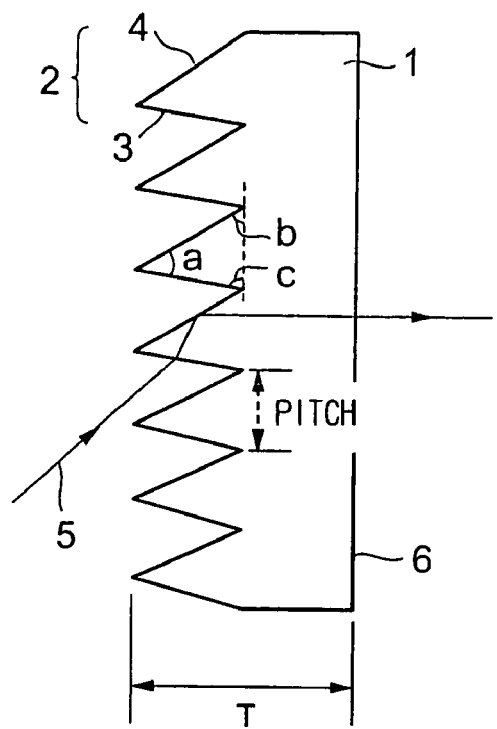
FIG. 2 is a view of an example of a Fresnel lens sheet suitable for use under a condition where light falls at a large incidence angle of the Fresnel lens sheet as shown in FIG. 1.

FIG. 2 is a sectional view of an example of a Fresnel lens sheet 1 suitable for use under a condition where light rays fall thereon at large incidence angles as shown in FIG. 1. The Fresnel lens sheet 1 has an entrance surface provided with a plurality of prisms 2 of a triangular cross section each having an entrance facet 3 and a total-reflection facet 4 that deflects part or all of light 5 fallen on the entrance facet 3 by total reflection in a desired direction.

Light 5 fall on different parts of the Fresnel lens sheet 1 at different incidence angles. Interior angles a, b and c of each prism 2 need to be changed optionally according to the incidence angle at which the light 5 falls on the prism 2. For example, the interior angles b and c may be changed with the angle a between the entrance facet 3 and the total-reflection facet 4, namely, the edge angle a, fixed or all the interior angles a, b and c may be changed. To increase the ratio of light emitted in a direction substantially perpendicular to the Fresnel lens sheet 1 to the incident light 5, i.e., light emission efficiency, it is preferable to form the prisms 2 having an edge angle a of about 40°. Desirably, the prisms 2 of the Fresnel lens sheet 1 are arranged at pitches of about 1 mm or below, preferably, about 0.1 mm, so that the prisms 2 cannot be visually recognized on the screen by the viewer. The screen sizes of most rear projection displays to which the Fresnel lens sheet 1 is applied are between 40 in. and 200 in., more precisely, between 50 in. and 70 in.

Figure 3:
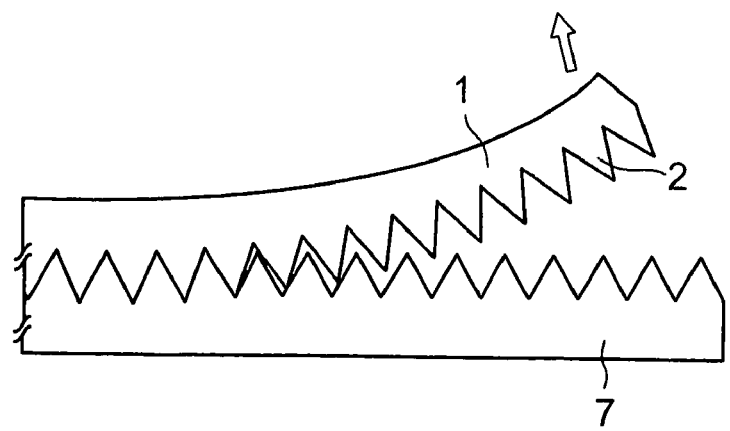
FIG. 3 is a view of assistance in releasing a Fresnel lens sheet from a forming mold.
Figure 4:
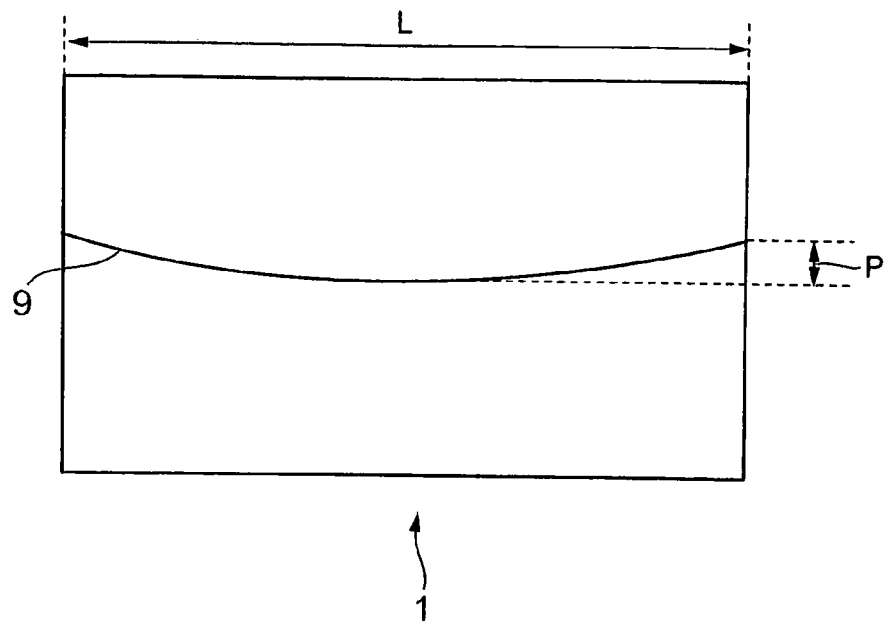
FIG. 4 is a schematic view of assistance in explaining the curving of an image of a horizontal straight line displayed on a screen.

As shown in FIG. 3, the Fresnel lens sheet 1 is made by forming a Fresnel lens sheet of a forming resin by a press molding process, an injection molding process, a UV molding process or a casting process using a forming mold 7 having a molding surface of a shape complementary to that of the Fresnel lens sheet and releasing the thus formed Fresnel lens sheet from the forming mold 7. Since the edge angle a of the prisms 2 of the Fresnel lens sheet 1 is a considerably acute angle of about 40° (for example, an angle between 36° and 44°), difficulty in releasing the Fresnel lens sheet from the forming die 7 has been a serious problem.

Therefore, the Fresnel lens sheet 1 is formed in a thickness T of 3 mm or below, more specifically, a thickness between 0.2 to 3 mm so that the thin, flexible Fresnel lens sheet 1 can be easily released from the forming mold 7 having the molding surface of a shape complementary to that of the Fresnel lens sheet 1 to release the Fresnel lens sheet 1 easily from the forming mold 7 and to manufacture the Fresnel lens sheet 1 efficiently. As mentioned above, the thin Fresnel lens sheet is not rigid and flexible and it is possible that the thin flexible Fresnel lens sheet warps image light.

The inventors of the present invention found that the distortion of an image displayed on the screen of a screen size of 50 in. or above of a rear projection display due to the warp of the Fresnel lens sheet 1 cannot be visually recognized by the viewer depending on the degree of warp of the Fresnel lens sheet 1 and that the limit of permissible warp of an image is about 3/1000 per unit length. For example, the inventors of the present invention found that it is very difficult for the viewer to visually recognize a vertical deflection P of a displayed image of a straight line 9 of a length equal to the horizontal length L (mm) of the Fresnel lens sheet 1 if the vertical deflection P is not greater than 3L/1000.

Figure 5:
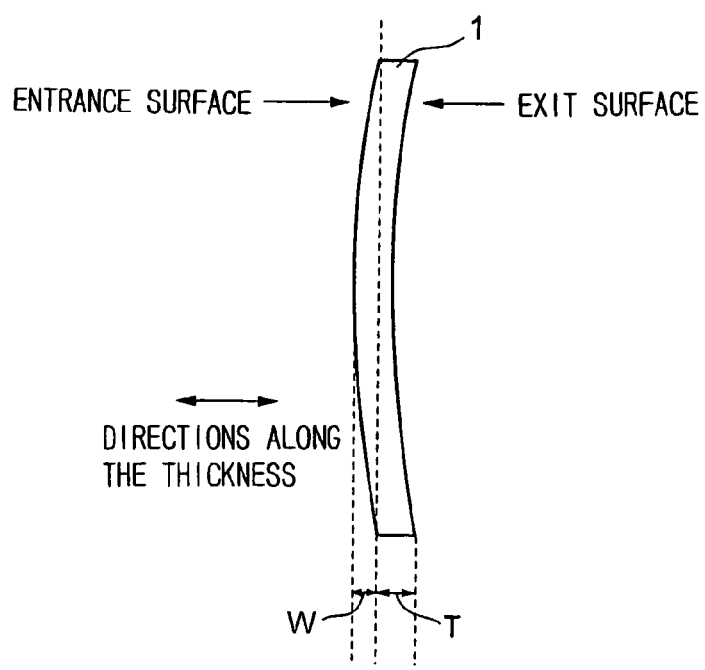
FIG. 5 is a schematic view of assistance in explaining the warping of a Fresnel lens sheet.

Generally, incident light falls on a central part of the Fresnel lens sheet 1 at an incidence angle between 60° and 65°. Therefore, a permissible deflection W (FIG. 5) of the Fresnel lens sheet 1 with respect to a direction along the thickness of the Fresnel lens sheet 1 is 3L/2000 to limit the deflection of the image of the straight line to 3L/1000 or below. For example, a 50 in. screen of 50 in. in diagonal dimension has a horizontal length of 1016 mm. Therefore, the deflection W of the Fresnel lens sheet 1 as applied to the 50 in. screen must be 1.5 mm or below. When a resin Fresnel lens sheet 1 of about 50 in. in diagonal dimension and about 3 mm in thickness T is held in a frame to form a self-supporting Fresnel lens sheet, the Fresnel lens sheet is caused to warp by a deflection W by its own weight and it is impossible to limit the deflection W to 1.5 mm or below.

In view of such a present situation, a Fresnel lens sheet holding structure of the present invention holds a thin Fresnel lens sheet 1 of 3 mm or below in thickness provided with prisms 2 having total-reflection facets 4 in a plane shape so that the Fresnel lens sheet may not warp to suppress the distortion of a displayed image.

Fresnel Lens Sheet Holding Structure

A Fresnel lens sheet holding structure according to the present invention holds the Fresnel lens sheet 1 (referred to simply as "sheet") of 3 mm or below in thickness having an entrance surface on which the prisms 2 having a triangular cross sections are arranged. Each of the prisms 2 has the entrance facet 3 and a total-reflection facet 4 for deflecting light fallen on the entrance facet 3 in a desired direction by total reflection. The Fresnel lens sheet holding structure has a hanging member 12 adhesively attached to the upper side 11 of the Fresnel lens sheet 1, and a support member 13 for supporting the hanging member 12.

Figure 6A:
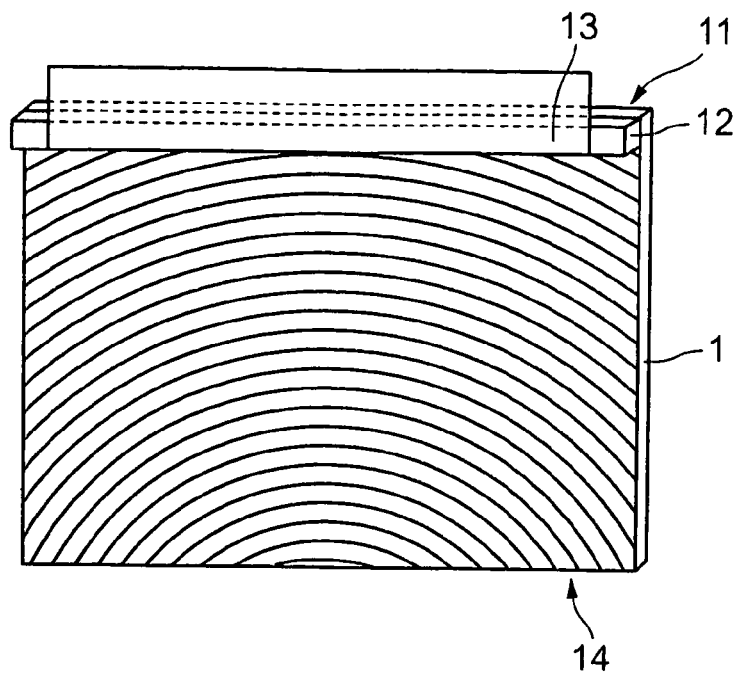
FIG. 6 is a view of a holding structure in a preferred embodiment according to the present invention.
Figure 6B:
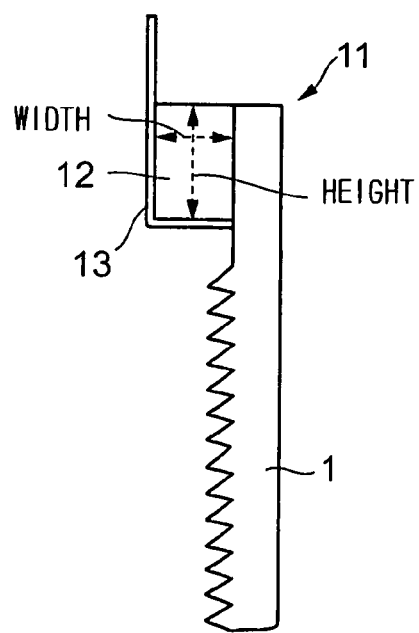

FIGS. 6(a) and 6(b) are a perspective view and a sectional view in a vertical plane, respectively, of a Fresnel lens sheet holding structure in a preferred embodiment according to the present invention. The Fresnel lens sheet holding structure includes a hanging member 12 of a length equal or substantially equal to the width of the Fresnel lens sheet 1 adhesively attached to the upper side 11 of the sheet 1, a support member 13 of an L-shaped cross section. The hanging member 12 is supported on a lower leg of the support member 13 to hang the sheet.

Although it is desirable that the hanging member 12 adhesively attached to the upper side of the sheet 1 has a rectangular cross section as shown in FIG. 6(b), the hanging member 12 may be of any shape provided that the hanging member 12 can be supported on the lower leg of the L-section support member 13. The hanging member 12 may be a bar of a length equal or substantially equal to the width of the sheet or may be a plurality of short blocks arranged at predetermined intervals in a row and adhesively attached to the upper side of the sheet 1. When the plurality of short blocks are used, it is desirable to extend elastic members, such as springs, in spaces between the adjacent short blocks to tension the sheet horizontally. There is not any particular restrictions on the shape of the L-section support member 13 shown in FIGS. 6 and 7, provided that the support member 13 is able to support the hanging member 12 thereon.

Figure 7A:
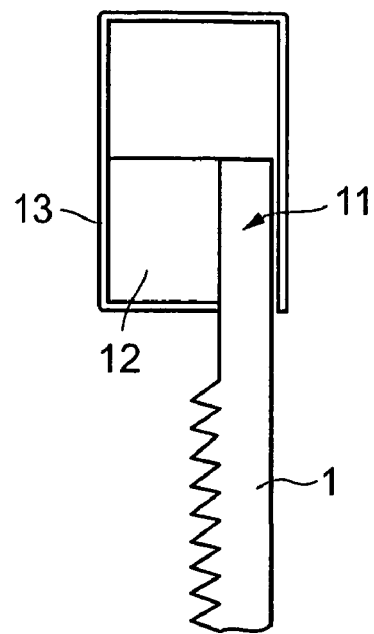
FIG. 7 is a view illustrating modes of holding peripheral parts of the upper side, the lower side, the right side and the left side of a Fresnel lens sheet by frame members of the holding structure shown in FIG. 6.
Figure 7C:
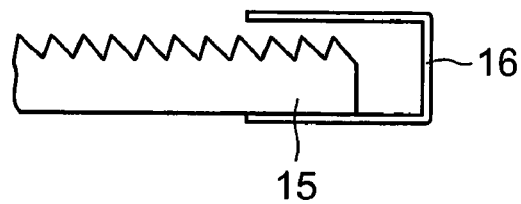
Figure 7B:
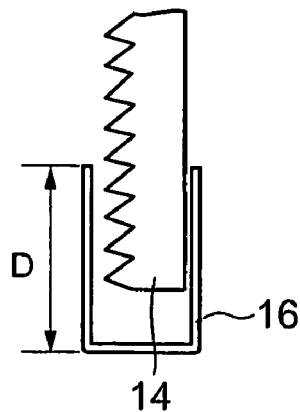

A Fresnel lens sheet holding structure in a preferred embodiment according to the present invention shown in FIG. 7 includes a frame 16 enclosing the sheet 1 and holding the upper side 11, the lower side 14, the right and the left side 15 of the sheet. FIGS. 7(a), 7(b) and 7(c) are a sectional view of an upper frame member holding the upper side 11 in a vertical plane, a sectional view of a lower frame member holding the lower side 14 in a vertical plane, and a sectional view of a side frame member holding the right (the left) side 15, respectively. The lower frame member 16 holding the lower side 14, and the side frame members 16 holding the right and the left sides 15 have a predetermined depth and are formed such that clearances are formed between the frame members and the corresponding sides 14 and 15 to provide dimensional options for the lower side 14 and the right and the left side 15 and to permit the sheet to extend and contract according to temperature variation.

Figure 8:
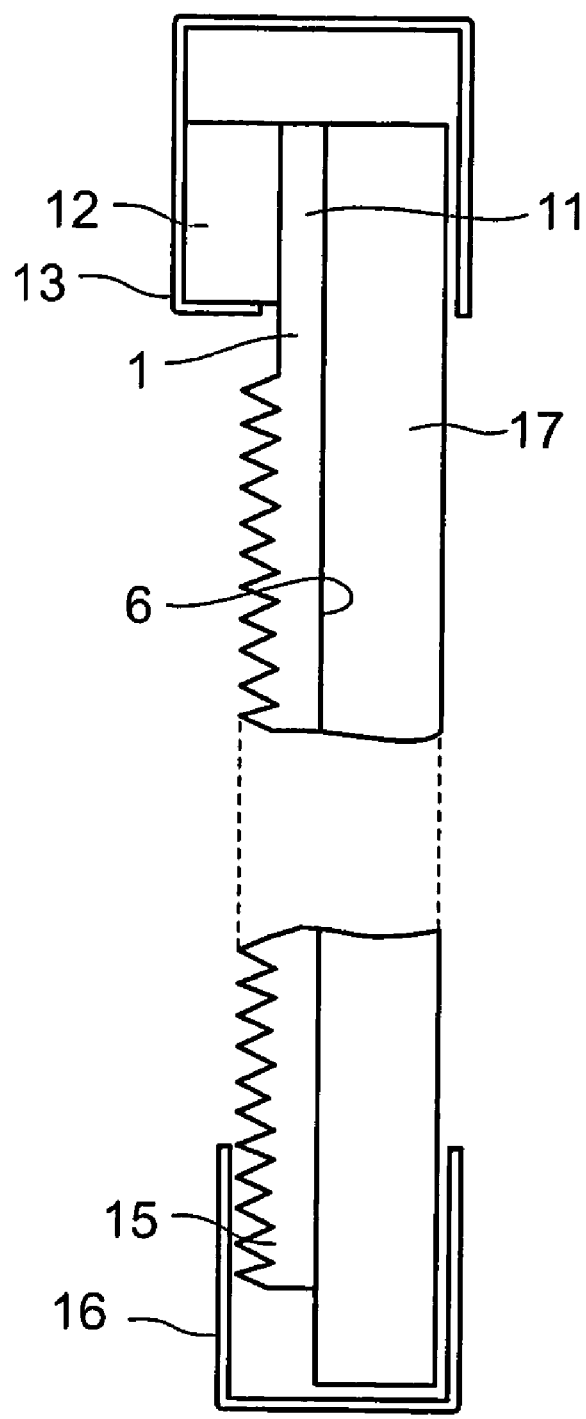
FIG. 8 is a sectional view in a vertical plane of a Fresnel lens sheet and a lenticular lens sheet contiguous with the front surface of the Fresnel lens sheet.

FIG. 8 is a sectional view in a vertical plane of Fresnel lens sheet holding structure holding a Fresnel lens sheet and a lenticular lens sheet contiguous with the front surface of the Fresnel lens sheet. A general transmission screen comprises a Fresnel lens sheet and a lenticular lens sheet. If the Fresnel lens sheet and the lenticular lens sheet are separate sheets and are disposed contiguously to build a transmission screen, the a lenticular lens sheet 17 is placed contiguously with the front surface 6 of a Fresnel lens sheet 1 having an entrance surface provided with total-reflection prisms 2. The thin Fresnel lens sheet 1 is affected significantly by the planarity of the lenticular lens sheet 17 contiguous with the Fresnel lens sheet 1. If the lenticular lens sheet 17 is sufficiently thick, i.e., if the lenticular lens sheet 17 has a thickness between about 5 and about 10 mm, and the deflection of the lenticular lens sheet 17 when the lenticular lens sheet 17 is set in a self-supporting mode on the lower frame member 16 is not greater than an upper limit permissible deflection, the Fresnel lens sheet 1 may be hung and the lower side of the lenticular lens sheet 17 may be seated on the lower frame member 16 as shown in FIG. 8. The permissible deflection of the lenticular lens sheet 17 set in a self-supporting mode on the lower frame member 16 causes the Fresnel lens sheet 1 to warp by a permissible deflection W in a direction along the thickness of the Fresnel lens sheet 1. More concretely, the deflection of the lenticular lens sheet 17 is reflected directly in the deflection of the Fresnel lens sheet 1. It is desirable that the permissible deflection is 3L/2000 or below.

FIG. 9 shows a Fresnel lens sheet holding structure in a preferred embodiment according to the present invention hanging a Fresnel lens sheet 1 and a lenticular lens sheet 17 in a sectional view in a vertical plane. This Fresnel lens sheet holding structure is preferable when the lenticular lens sheet 17 is thin and the deflection of the lenticular lens 17 when the lenticular lens sheet 17 is set in a self-supporting mode exceeds an upper limit permissible deflection. As shown in FIG. 9, both a hanging member 12 attached to the Fresnel lens sheet 1 and a hanging member 18 attached to the lenticular lens sheet 17 are supported on a support member 13

Figure 9B:
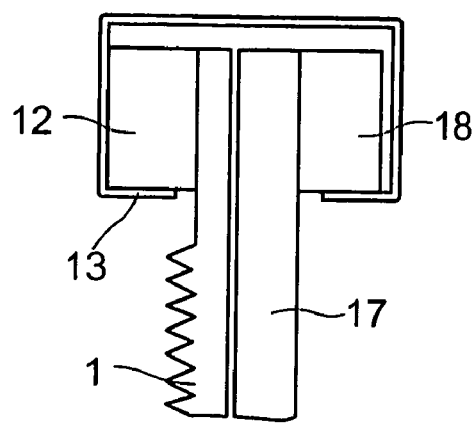
FIG. 9 is a sectional view in a vertical plane of a mode of hanging a Fresnel lens sheet and a lenticular lens sheet from a support member.
Figure 9A:
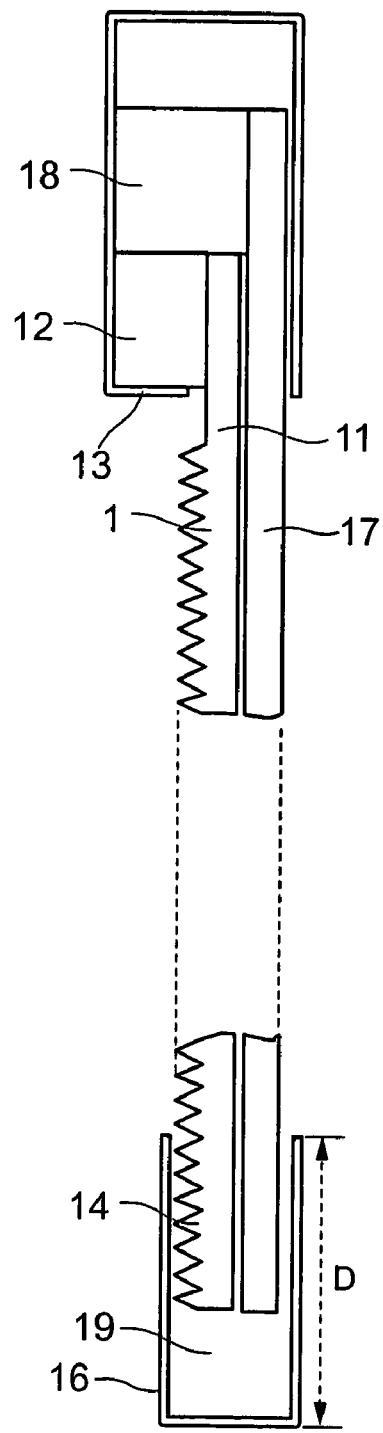

More concretely, in FIG. 9(a), a hanging member 12 adhesively attached to the upper side 11 of the Fresnel lens sheet 1 is mounted on the lower leg of an L-section support member 13, and a hanging member 18 adhesively attached to the upper side of the lenticular lens sheet 17 is mounted on the hanging member 12. Thus, the Fresnel lens sheet 1, the lenticular lens sheet 17 and the hanging members 12 and 18 are supported on the lower leg of the L-section support member 13 to hang the sheets 1 and 17. In FIG. 9(b), a hanging member 12 adhesively attached to the Fresnel lens sheet 1 is supported on one, on the side of a light source, of lower flanges of a support member 13, and a hanging member 18 adhesively attached to the lenticular lens sheet 17 is supported on the other lower flange of the support member 13. There are not any particular restrictions on the hanging members and any suitable hanging members may be adhesively attached to the Fresnel lens sheet 1 and the lenticular lens sheet 17.

When the sheet is thus hung, the lower, the right and the left side of the sheet may be held in the frame members of a predetermined depth D of a frame 16 with clearances 19 formed between those sides and the walls of the frame members of the frame 16 to provide dimensional options for the lower, the right and the left side.

Figure 10:
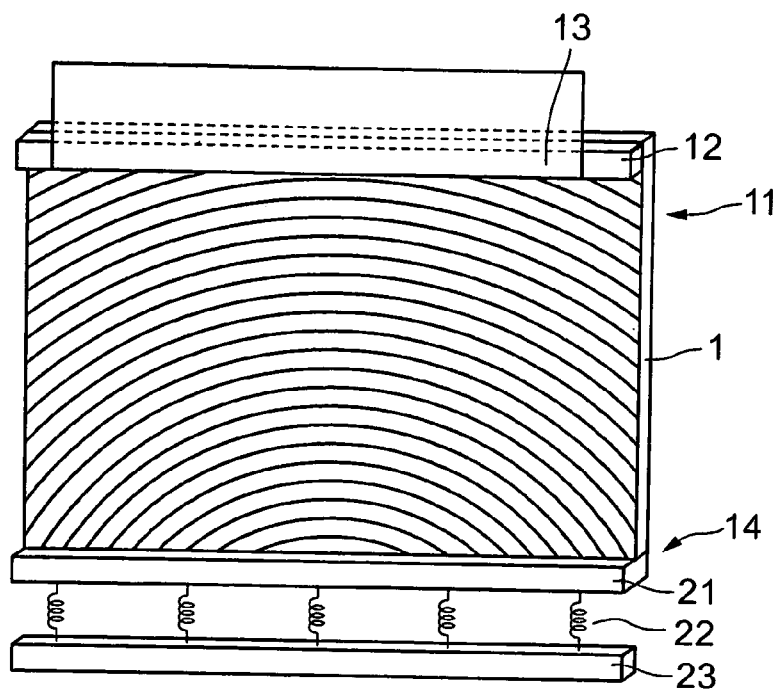
FIG. 10 is a perspective view of a mode of attaching a tensioning member to the lower side of a Fresnel lens sheet.

FIG. 10 is perspective view of a Fresnel lens sheet holding structure in a preferred embodiment according to the present invention including a tensioning member 21 attached to the lower side of a Fresnel lens sheet 1. The tensioning member 21 is pulled downward by elastic members 22. Each of the elastic members 22 has one end attached to an elastic member holding member 23. Preferably, the elastic member holding member 23 is fastened to a rear projection display so as to pull the tensioning member 21 downward by the elastic members. The elastic member holding member 23 may be not attached to the rear projection display and may pull the tensioning member 22 downward by its own weight. In either case, the lower side 14 of the Fresnel lens sheet 1 is pulled downward by tensile force exerted thereon by the elastic members 22 and the elastic member holding member 23. Thus, the Fresnel lens sheet holding structure stretches the thin Fresnel lens sheet 1 of 3 mm or below in thickness vertically to form a transmission screen having very high planarity. Since the screen is resistant to warping and hence images displayed on the screen are scarcely distorted. The elastic members 22 may be any suitable ones, such as springs as shown in FIG. 10, plate springs or constant-pressure springs.

Figures 11A, 11B:
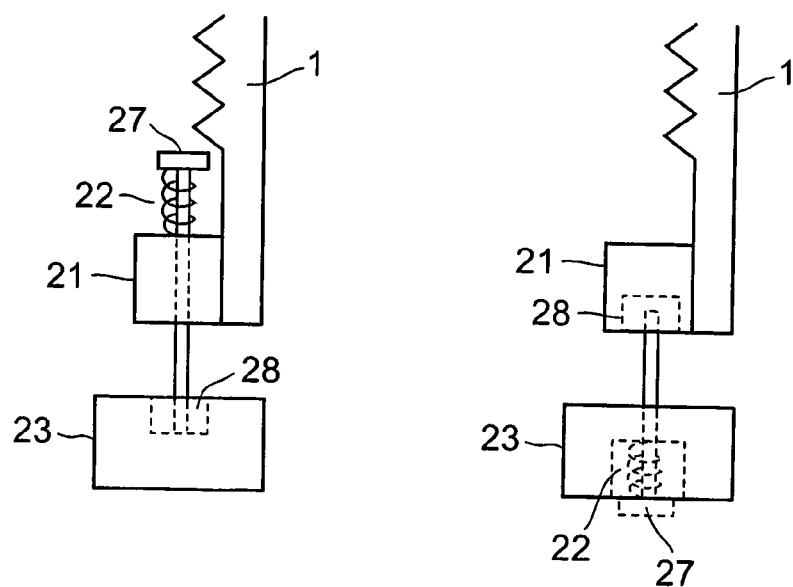
FIG. 11 is a view of examples of tensioning members adhesively bonded to the lower side of a Fresnel lens sheet.

FIGS. 11(a) and 11(b) illustrate connecting methods of connecting the tensioning member 21 and the elastic member holding member 23. The elastic member holding member 23 is fastened to a rear projection display. The method illustrated in FIG. 11(a), passes a bolt (connecting member) 27 through a hole formed in the tensioning member 21 with an elastic member (spring) 22 extended between the head of the bolt 27 and the upper surface of the tensioning member 21, and screws the bolt in the threaded hole of a nut 28 attached to the elastic member holding member 23. The method illustrated in FIG. 11(b) passes a bolt (connecting member) 27 through a hole formed in the elastic member holding member 23 with an elastic member (spring) 22 extended between the head of the bolt 27 and the elastic member holding member 23, and screws the bolt 27 in the threaded hole of a nut 28 attached to the tensioning member 21.

FIG. 12 illustrates tensioning methods not using any elastic members. The tensioning method illustrated in FIG. 12(a) suspends a weight 29 from the tensioning member 21. The tensioning method illustrated in FIG. 12(b) mounts a weight 29 on the tensioning member 21. Either of the tensioning methods pulls the Fresnel lens sheet 1 downward by a tensioning member 21 attached to the lower side 14 of the Fresnel lens sheet 1 to tension the Fresnel lens sheet 1.

FIG. 13 shows a Fresnel lens sheet holding structure in a preferred embodiment according to the present invention. This Fresnel lens sheet holding structure tensions a Fresnel lens sheet both vertically and horizontally. It is preferable to tension the Fresnel lens sheet vertically and horizontally when the Fresnel lens sheet is required to have high planarity for use in combination with a display for displaying high-definition images or drawings. This Fresnel lens sheet holding structure further improves the planarity of the Fresnel lens sheet.

As shown in FIG. 13, a side member 31 similar to the hanging member 12 is adhesively attached to, for example, the right side of the Fresnel lens sheet, the side member 31 is held by a holding member 32 having an L-shaped cross section. A tensioning member 33 is adhesively attached to, for example, the left side of the Fresnel lens sheet, elastic members 34 attached to the tensioning member 33 are connected to an elastic member holding member 35 to tension the Fresnel lens sheet horizontally. Thus, the Fresnel lens sheet can be tensioned both vertically and horizontally. A Fresnel lens sheet of 1 mm or below in thickness easily releasable from a forming mold has a low rigidity. Therefore it is desirable to tension such a thin Fresnel lens sheet both vertically and horizontally to maintain the Fresnel lens sheet in a satisfactory planarity and to prevent distorting images.

Figure 14:
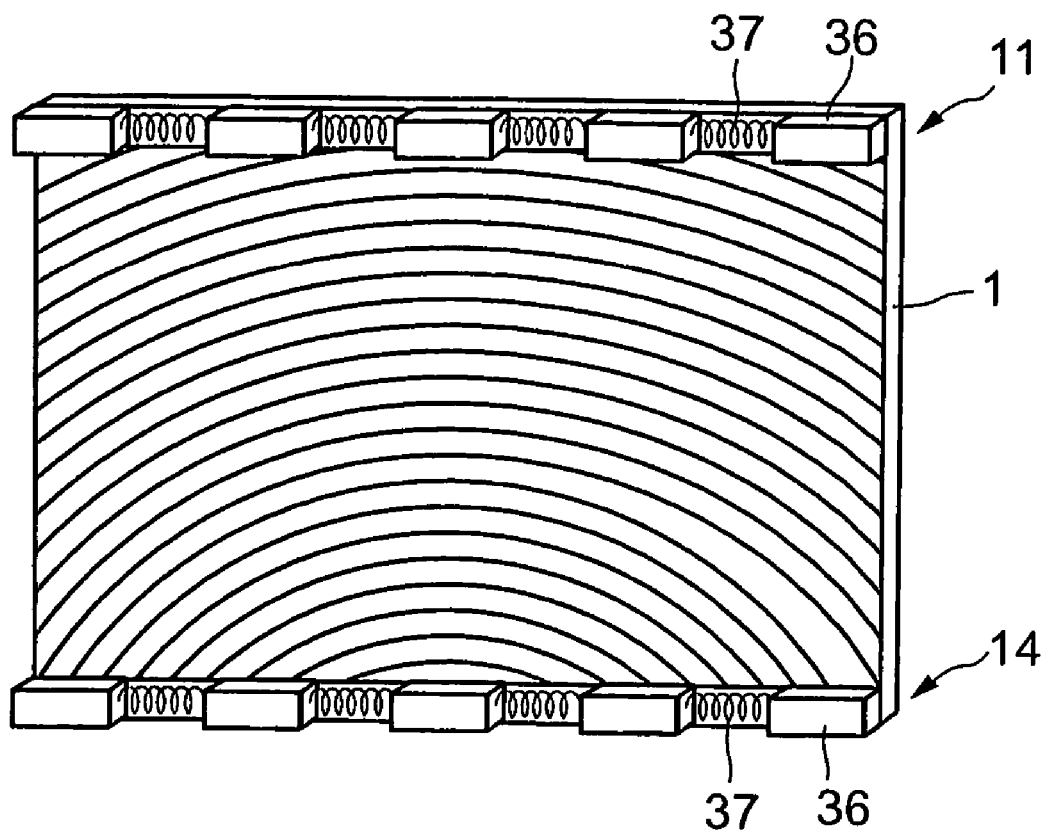
FIG. 14 is a view of a mode of tensioning a Fresnel lens sheet horizontally.

FIG. 14 shows a Fresnel lens sheet holding structure capable of tensioning a Fresnel lens sheet in both vertical directions and horizontal directions. Short blocks 36 are arranged at optional intervals along and attached to the upper side 11 and the lower side 14 of a Fresnel lens sheet 1. Elastic members 37 are extended between the adjacent short blocks 36 so as to push the adjacent short blocks 36 away from each other. When the Fresnel lens sheet 1 is hold by this Fresnel lens sheet holding structure, any blocks do not need to be adhesively attached to the right and the left side of the Fresnel lens sheet 1 and any springs do not need to be attached to the right and the left side of the Fresnel lens sheet 1. Therefore, right and left frame members may be of simple construction and may be of a narrow width.

Figure 15:
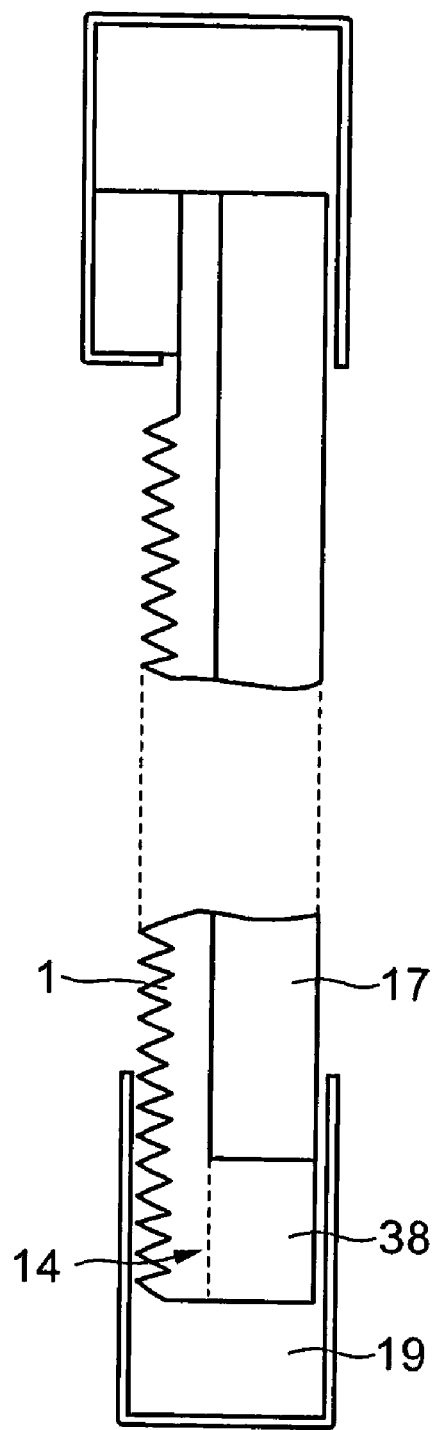
FIG. 15 is a view of a mode of adhesively attaching a block to the lower side of a Fresnel lens sheet and mounting a lenticular lens sheet on the block.

FIG. 15 shows a Fresnel lens sheet holding structure in a preferred embodiment according to the present invention. As shown in FIG. 15, a block 38 is attached adhesively to the lower side 14 of a Fresnel lens sheet 1, and a lenticular lens sheet 17 is supported on the block 38. When the deflection of the lenticular lens sheet 17 is below an upper limit of permissible deflection when the lenticular lens sheet 17 is set up in a self-supporting mode, this Fresnel lens sheet holding structure is able to tension the Fresnel lens sheet 1 vertically by the weight of the lenticular lens sheet 17.

The block 38 may be attached to the Fresnel lens sheet 1 by adhesive bonding or any suitable attaching method, such as a mechanical attaching method using screws.

A Fresnel lens sheet holding structure in a preferred embodiment according to the present invention will be described.

FIG. 16 shows a Fresnel lens sheet holding structure capable of vertically and horizontally tensioning a Fresnel lens sheet 1 by way of example. This Fresnel lens sheet holding structure includes a rigid sheet 39, namely, tensioning member, attached to the Fresnel lens sheet 1. The lower side 14 of the Fresnel lens sheet 1 is depressed by the rigid sheet 39 contiguous with the exit surface of the Fresnel lens sheet 1.

Figure 16A:
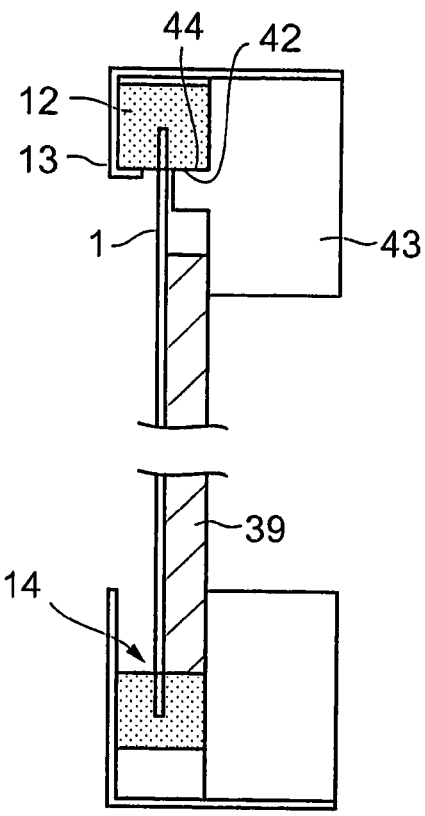
FIG. 16 is a view of a mode of a holding structure capable of tensioning a Fresnel lens sheet vertically and horizontally.
Figure 16B:
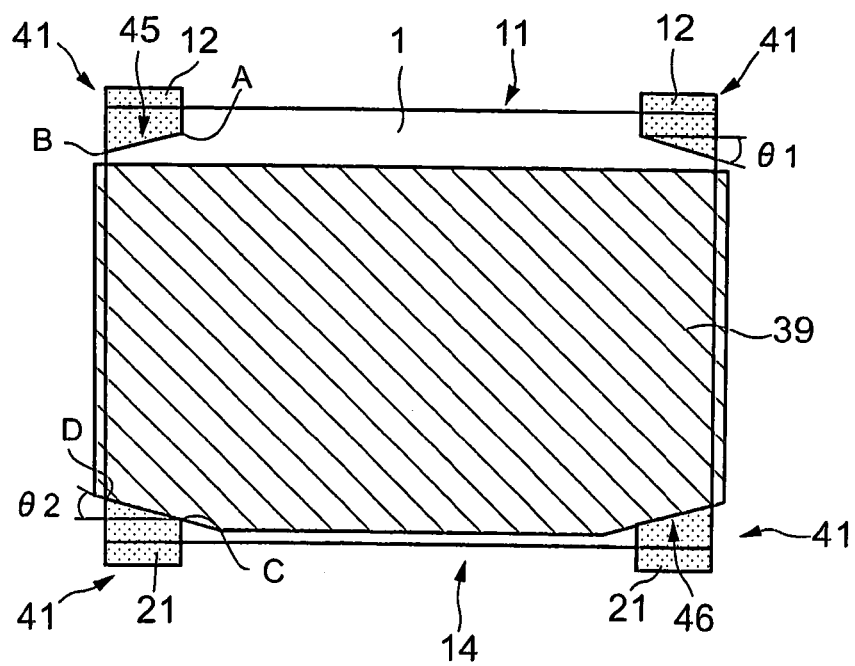

Referring to FIGS. 16(a) and 16(b), it is preferable that joining planes 45 in which the lower surfaces 42 of end parts of the hanging member 12 corresponding to the right and left end parts of the upper side 11 of the Fresnel lens sheet 1 and the upper surfaces 44 of right and left end parts, corresponding to the right and the left end part 41 of the upper side 11 of the Fresnel lens sheet 1, of a support member 43 supporting the hanging member 12 are joined are inclined such that a point B specified by coordinates on the side of the end of the Fresnel lens sheet on the joining plane is at a level lower than that of a point A specified by coordinates on the side of the center of the Fresnel lens sheet 1 on the joining plane 45, and joining planes 46 in which the upper surfaces of parts of a tensioning member 21 corresponding to right and left end parts of the lower side 14 of the Fresnel lens sheet 1 and the lower surface of parts of the rigid sheet 39 mounted on the tensioning member 21 corresponding to the right and the left end part are joined are inclined such that a point D specified by coordinates on the side of end of the Fresnel lens sheet 1 on the joining plane 46 is at a level higher than that of a point C specified by coordinates on the side of the center of the Fresnel lens sheet 1 on the joining plane 46. This Fresnel lens sheet holding structure applies forces acting horizontally outward and vertically outward to the Fresnel lens sheet 1 to prevent the Fresnel lens sheet 1 from warping and distorting and hence displayed images are scarcely distorted.

Figure 17A:
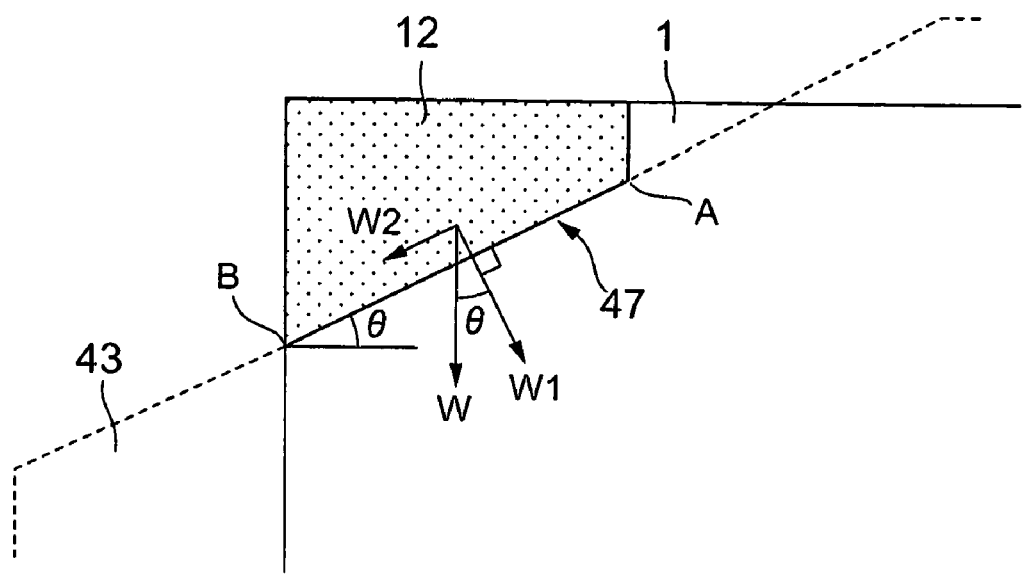
FIG. 17 is a view of assistance in explaining the effect of inclined surfaces shown in FIG. 16.
Figure 17B:
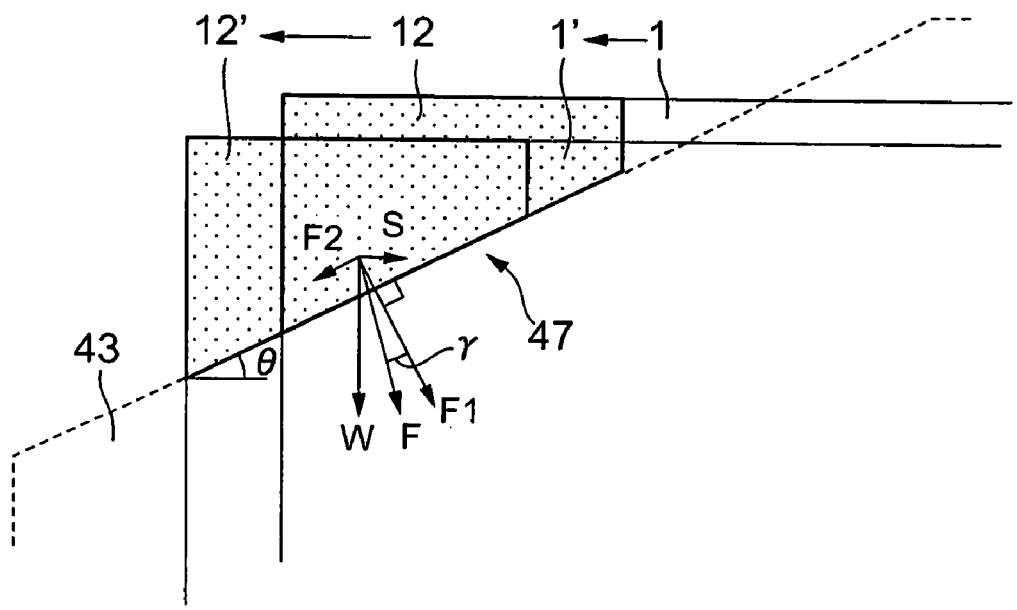

FIG. 17(a) and 17(b) are views of assistance in explaining the effect of such inclined joining plates. Referring to FIG. 17(a), any horizontal force does not act on the Fresnel lens sheet 1, and the weight of the Fresnel lens sheet 1 and that of the rigid sheet mounted on the tensioning member 21 attached to the lower side of the Fresnel lens sheet 1 pull the Fresnel lens sheet 1 vertically downward. A surface 47 in contact with the lower surface of the hanging member 12 is inclined such that a point B specified by coordinates on the side of the end of the Fresnel lens sheet 1 is at a level lower than that of a point A specified by coordinates on the side of the center of the Fresnel lens sheet 1.

Suppose that a force W corresponds to the sum of the respective weights of the Fresnel lens sheet 1 and the rigid sheet mounted on the tensioning member attached to the lower side of the Fresnel lens sheet 1. Then, a force $W1=W \cos \theta$ acts on the surface 47 in contact with the lower surface of the hanging member perpendicularly to the surface 47, and a force $W2=W \sin \theta$ acts along the surface 47. When $W2 > \alpha \times W1$, where $\alpha$ is coefficient of static friction, is satisfied, the hanging member 12 slides down obliquely leftward along the surface 47.

FIG. 17(b) shows the relation between a condition before sliding and a condition after sliding. The Fresnel lens sheet 1 and the hanging member 12 move down obliquely leftward to positions 1' and 12', respectively. The right hanging member moves similarly to the left hanging member. Consequently, the Fresnel lens sheet 1 is stretched laterally and an inward reaction force S is developed in the Fresnel lens sheet 1.

Since the Fresnel lens sheet 1 is held so as to be vertically stretchable, the rigid sheet moves down as the tensioning member attached to the lower side of the Fresnel lens sheet 1 moves down. Thus a vertical force similar to that in the initial state shown in FIG. 17(a) is developed. Therefore, the force W acts vertically and a force S acts horizontally on the shifted left hanging member 12'. Consequently, a force F, i.e., the vector sum of the forces W and S, acts on the shifted left hanging member 12'. The force F is decomposed into a force $F1$ ($=F \cos \gamma$, where $\gamma$ is angle between the line of action of the force F and a perpendicular to the surface 47) acting perpendicularly on the surface 47 in contact with the lower surface of the shifted hanging member 12', and a force $F2$ ($=F \sin \gamma$) acting along the surface 47. When an inequality: $F2 > \alpha \times F1$, where $\alpha$ is coefficient of static friction, is not satisfied, the hanging member 12 is unable to slide down obliquely leftward along the surface 47 and the hanging member 12 stops.

In a dynamically stable state where the hanging member 12 is stationary, the vertically downward force W, namely, the sum of the respective weights of the Fresnel lens sheet 1 and the rigid sheet, and the inward reaction force S resulting from stretching of the Fresnel lens sheet 1 are in stable balance according to the inclination $\theta$ of the surface 47 and coefficient of static friction between the hanger 12 and the surface 47. Consequently, the Fresnel lens sheet 1 can be always stretched vertically and horizontally to prevent the Fresnel lens sheet 1 from warping.

When the Fresnel lens sheet 1 tends to contract, for example, under a condition where the temperature of the Fresnel lens sheet 1 drops, the horizontal reaction force S, namely, an internal force, increases. Then, the angle $\gamma$ between the line of action of the force F, i.e., the resultant force of the force W equal to the sum of the respective weights of the Fresnel lens sheet 1 and the rigid sheet and the horizontal reaction force S and a perpendicular to the surface 47 becomes $-\gamma$ and the force F2 acts obliquely upward to the right. Then, a force F1 ($-F \cos \gamma$) acts perpendicularly to the surface 47 in contact with the lower surface of the hanging member 12, and a force F2 ($=F \sin \gamma$) acts along the surface 47. When $F2 > \alpha \times F1$, where $\alpha$ is coefficient of static friction, is satisfied, the hanging member 12 slides up obliquely rightward along the surface 47.

It is preferable that the coefficient of static friction is small to stabilize the vertical and horizontal stretching forces acting on the Fresnel lens sheet 1, to prevent the Fresnel lens sheet 1 from warping to enable the hanging member 12 to move smoothly according to the extension and contraction of the Fresnel lens sheet 1 and to make slippery the surface 47 in contact with the lower surface of the hanging member 12 attached to the upper side of the Fresnel lens sheet. It is also preferable that a surface in contact with the upper surface of the tensioning member attached to the lower side of the Fresnel lens sheet 1 and the lower surface of the rigid sheet is slippery. When the coefficient of static friction and the condition of the surfaces meet such conditions, the warping of the Fresnel lens sheet 1 can be more surely prevented and it is possible to prevent the breakage of the Fresnel lens sheet 1 due to horizontal stretching forces exceeding the strength of the Fresnel lens sheet 1 that act on the Fresnel lens sheet 1 when the Fresnel lens sheet 1 is unable to contract. Preferably, the coefficient of static friction is 0.7 or below, more preferably, 0.5 or below. A method of making the surface slippery attaches a Teflon® tape to the surface. When the surface is coated with a Teflon® tape, the coefficient of static friction is about 0.5. The coefficient of static friction can be reduced to 0.3 or below by using rollers.

The surface 47 in contact with the lower surface of the hanging member 12 attached to the upper side of the Fresnel lens sheet 1 is inclined such that a point specified by coordinates on the side of the end of the Fresnel lens sheet 1 is at a level lower than that of a point specified by coordinates on the side of the center of the Fresnel lens sheet 1. Preferably, the inclination $\theta 1$ of the surface 47 meets the inequality: $W2 > \alpha 1 \times W1$, namely, $\alpha 1 < \tan \theta 1$, specifying a condition that permits the hanging member to slide. The inclination $\theta 1$ is in the range of about 30° to about 60°. The contact surface, namely, the upper surface, of the tensioning member 21 attached to the lower side of the Fresnel lens sheet 1 in contact with the lower surface of the rigid sheet is inclined such that a point specified by coordinates on the side of end of the Fresnel lens sheet on the contact surface is at a level higher than that of a point specified by coordinates on the side of the center of the Fresnel lens sheet on the contact surface. Preferably, the inclination $\theta 2$ of the contact surface meets an inequality: $\alpha 2 < \tan \theta 2$. The inclination $\theta 2$ is in the range of about 30° to about 60°.

Preferably, the rigid sheet 39 is a lenticular lens sheet of a thickness between about 5 to about 10 mm.

The optical elements including Fresnel lens sheet 1 and the lenticular lens sheet held by the Fresnel lens sheet holding structure of the present invention can be formed by a casting process, a press molding process, an extrusion molding process or a photosetting process represented by a UV curing process using a base sheet or a base film. Preferably the hanging member and the tensioning member are formed of a material forming the optical elements including the Fresnel lens sheet. The hanging member and the tensioning member formed of a material forming the optical elements have the same environment-dependent properties as the optical elements. Suitable materials for forming the hanging member and the tensioning member are synthetic resins including acrylic resins, styrene resins, polycarbonate resins and PETs. The hanging member and the tensioning member may be formed of a material other than those mentioned above and may formed of a metal.

The hanging member and the tensioning member are adhesively attached to the Fresnel lens sheet 1. The hanging member and the tensioning member may be fastened to the Fresnel lens sheet 1 by a mechanical fastening method, such as a method using screws. Suitable materials for forming the support member are not limited to synthetic resins and metals.

Fresnel Lens Sheet

Preferably, the Fresnel lens sheet is formed of a transparent resin having a small wet elongation, such as a styrene resin, an acryl-styrene copolymer or a polycarbonate resin. The Fresnel lens sheet 1 is made by forming the foregoing resin by a casting process, a press molding process, an extrusion molding process or a UV curing process using a forming mold having a molding surface of a shape complementary to that of the Fresnel lens sheet. The transparent resin may be a pure, homogeneous one. Since the total-reflection Fresnel lens sheet to which the present invention is applied is liable to produce stray light rays, it is preferable to resort to various means for preventing the production of stray light rays.

Figure 18:
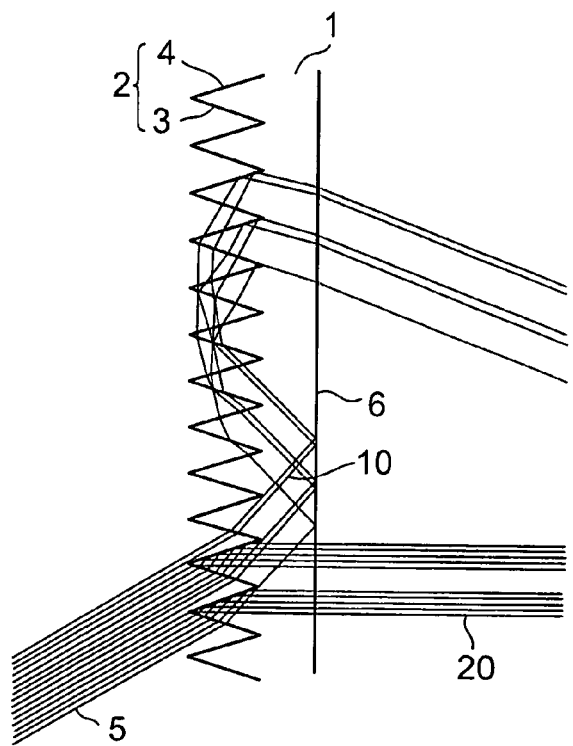
FIG. 18 is view of assistance in explaining traces of stray light rays in a Fresnel lens sheet.

Referring to FIG. 18, stray light rays 10 are those that do not fall on the total-reflection facets 4 among image light rays 5 fallen on the entrance facets 3. Stray light rays 10 are produced when the image light rays 5 fall on the Fresnel lens sheet at a small incidence angle. Therefore, stray light rays 10 are liable to be produced in a lower end part of the Fresnel lens sheet. Stray light rays 10 are reflected by the exit surface 6, and the reflected stray light rays 10 are diffracted repeatedly by the entrance facets 3 and leave the Fresnel lens sheet. The stray light rays 10 thus reflected and refracted leaves the Fresnel lens sheet from positions different from those where the normal image light rays 20 normally reflected by the total-reflection facets 4. Consequently, a double image is displayed.

Formation of a double image by the normal light rays and the stray light rays is suppressed by the following means.

Figure 19:
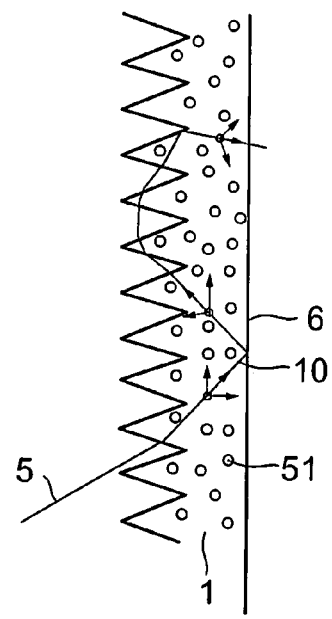
FIG. 19 is a sectional view of a Fresnel lens sheet containing diffusing material that diffuses light.

A first double image suppressing means adds a dispersing agent to the Fresnel lens sheet. FIG. 19 is a sectional view of a Fresnel lens sheet containing a diffusing material 51 by way of example. The diffusing material 51 is selectively determined taking into consideration the difference in refractive index between the resin forming the Fresnel lens sheet and the diffusing material 51. The diffusing material 51 is, for example, fine particles of an organic material, such as a styrene resin, a silicone resin, an acrylic resin or an MS resin or fine particles of an inorganic material, such as barium sulfate, glass, aluminum hydroxide, calcium carbonate, silica (silicon dioxide) or titanium oxide. One or some of those diffusing materials are added to the resin. The particles may be of any suitable shape, such as spherical particles, substantially spherical particles or amorphous particles. Stray light rays 10 that travel long optical paths in the Fresnel lens sheet are refracted repeatedly and are diffused by the diffusing material 51 contained in the Fresnel lens sheet and conspicuous double images are not formed.

A second double image suppressing means colors the Fresnel lens sheet to absorb light. Suitable coloring matters for coloring the Fresnel lens sheet are black dyes, pigments and carbon black. A colored Fresnel lens sheet is formed by forming a resin containing a coloring matter by a casting process or an extrusion molding process. Stray light rays 10 that travel long optical paths in the Fresnel lens sheet, as compared with normal image light rays 20 that travel short optical paths, are absorbed greatly by the Fresnel lens sheet and hence conspicuous double images are not formed.

Figure 20:
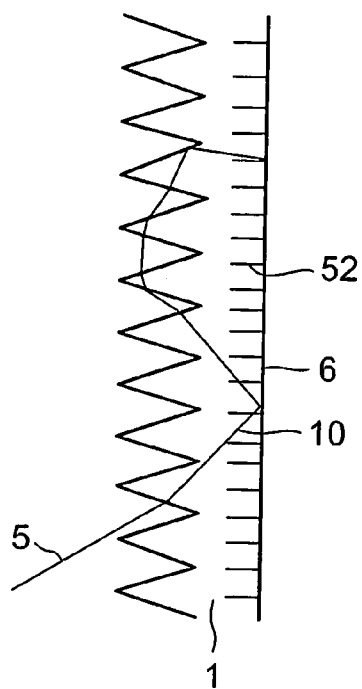
FIG. 20 is a sectional view of a Fresnel lens sheet provided with a light-absorbing layer.

A third double image suppressing means forms a light-absorbing layer on a Fresnel lens sheet. FIG. 20 shows a Fresnel lens sheet relating with the present invention and provided with a light-absorbing layer 52. The light-absorbing layer 52 has grooves formed in the exit surface of the Fresnel lens sheet. The light-absorbing layer 52 has narrow grooves of about 10 µm in width and about 100 µm extending in parallel to a direction in which light travels, arranged at equal intervals and filled up with black ink by a wiping method. Stray light rays 10 that travel long optical paths in the Fresnel lens sheet are absorbed by the light-absorbing layer 52 and hence conspicuous double images are not formed.

Figure 21:
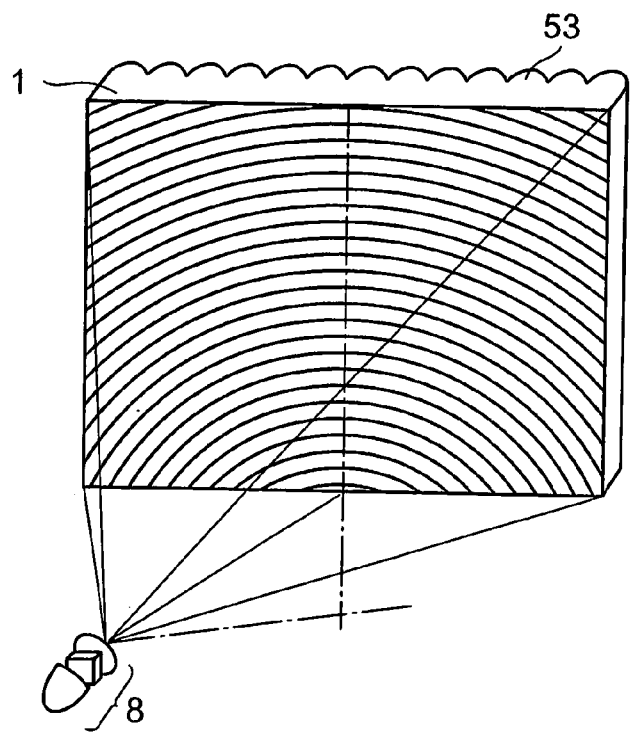
FIG. 21 is a view of a Fresnel lens sheet having an exit surface provided with vertical lenticular lenses having a semicircular cross section.
Figure 22:
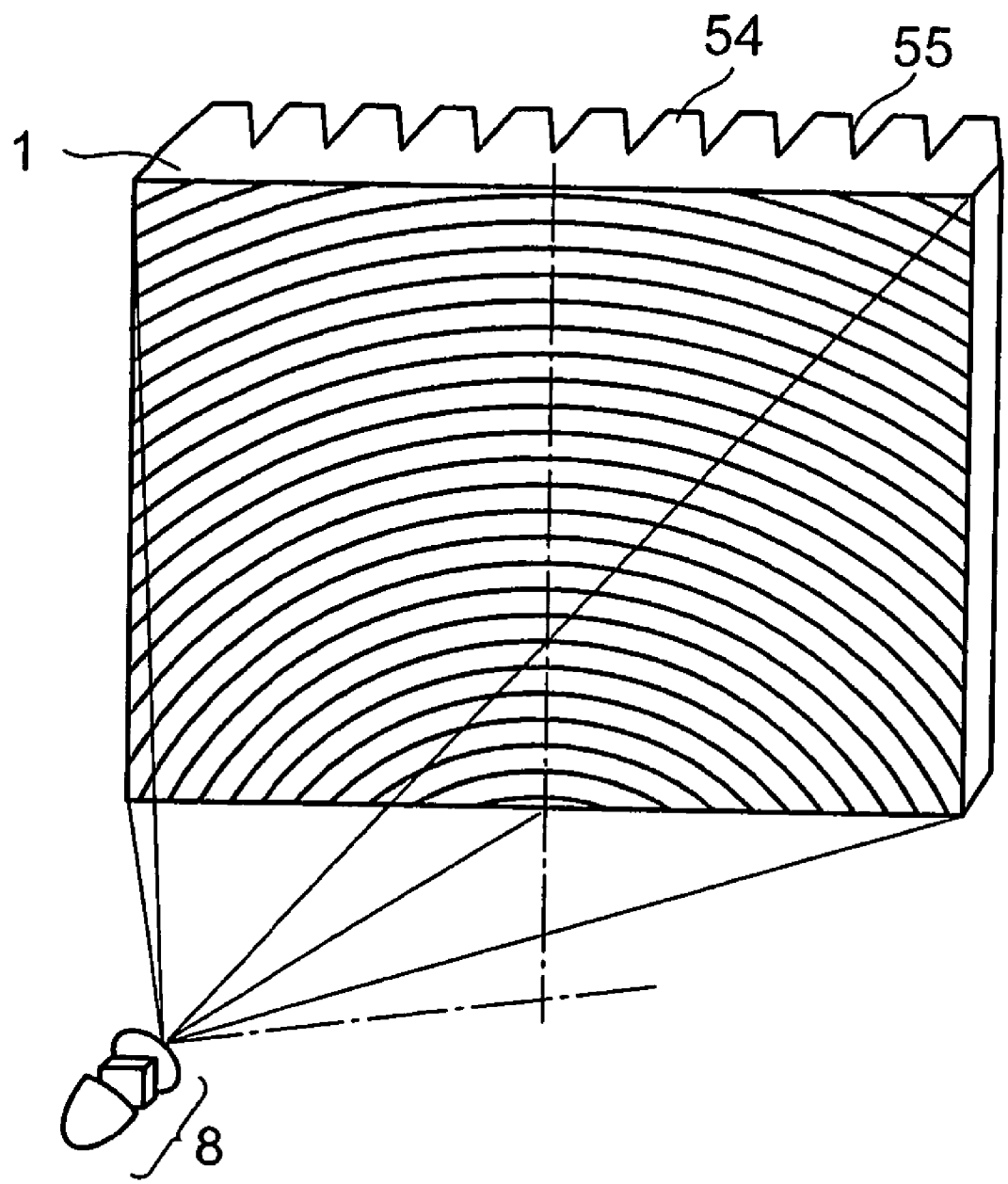
FIG. 22 is a view of a Fresnel lens sheet having an exit surface provided with vertical lenticular lenses having a trapezoidal cross section.

A fourth double image suppressing means forms lenticular lenses capable of diffusing light on the exit surface of a Fresnel lens sheet. FIG. 21 shows a Fresnel lens sheet 1 provided on its exit surface with vertical lenticular lenses 53 having a semicircular cross section, and FIG. 22 shows a Fresnel lens sheet 1 provided on its exit surface with vertical lenticular lenses 54 having a trapezoidal cross section. The lenticular lenses 53 having a semicircular cross section diffuse light rays including stray light rays horizontally and hence conspicuous double images are not formed. The lenticular lenses 54 having a trapezoidal cross section reflect light rays by the inclined facets thereof in a total-reflection mode and hence conspicuous double images are not formed. The Fresnel lens sheet may be provided with horizontal lenticular lenses instead of the vertical lenticular lenses.

The foregoing double image suppressing means is applied to the Fresnel lens sheet relating with the present invention to suppress the influence of stray light rays to the least possible extent.

A Fresnel lens sheet relating with the present invention may be provided with a low-reflection layer capable of reducing reflectance on one of or both the surfaces thereof. Preferably, the low-reflection layer is formed of a material having a small refractive index, such as a fluorocarbon resin or a silicone resin. Generally, the low-reflection layer is formed by a coating method, such as a dipping method or a flow-coating method. Preferably, the low-reflection layer is formed on the exit surface of the Fresnel lens sheet. It is more effective to form low-reflecting layers on both the surfaces of the Fresnel lens sheet, respectively. Since the low-reflection layer has an antireflection effect, the reduction of the contrast of images due to the reflection of light by the surface of the Fresnel lens sheet can be suppressed.

The foregoing low-reflection layer may be formed on a Fresnel lens sheet provided with lenticular lenses and a composite transmission screen formed by combining a Fresnel lens sheet and a lenticular lens sheet.

Rear Projection Display

Figure 23:
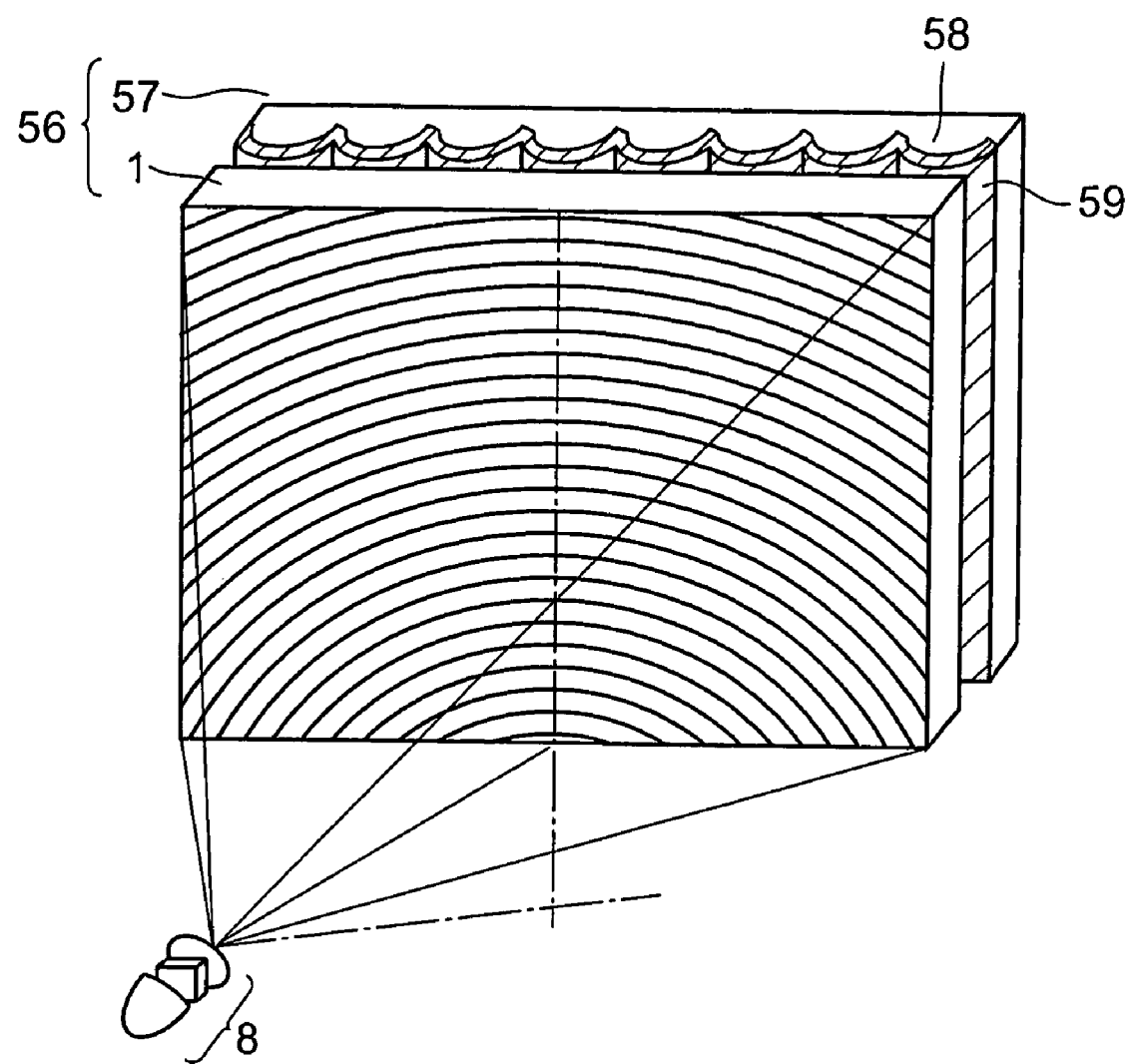
FIG. 23 is a view of an example of a transmission screen.
Figure 24:
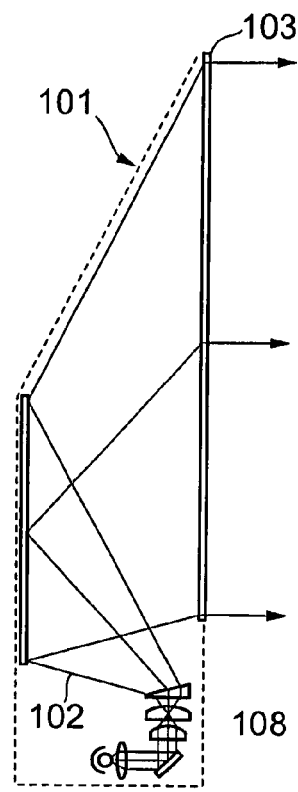
FIG. 24 is a schematic view of a thin rear projection display.
Figure 25:
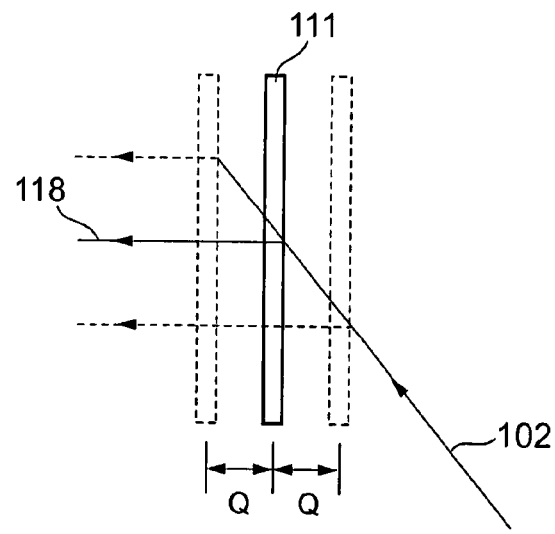
FIG. 25 is a schematic view of assistance in explaining the shift an image due to the shift of a Fresnel lens sheet.
Figure 26:
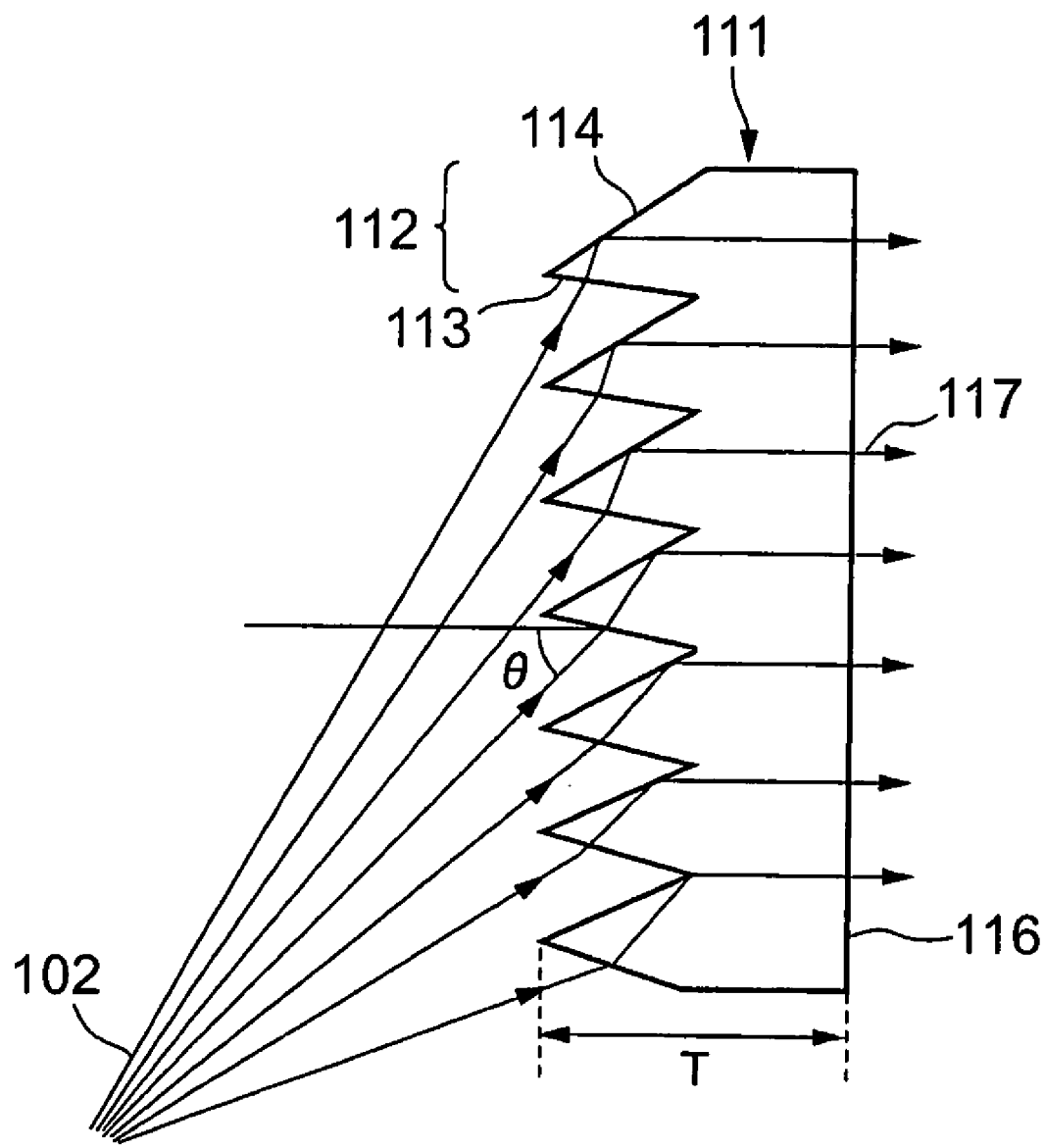
FIG. 26 is a sectional view of an example of a total-reflection Fresnel lens.

A transmission screen may consist of only the Fresnel lens sheet relating with the present invention, of a Fresnel lens sheet 1 relating with the present invention and a lenticular lens sheet in combination as shown in FIG. 23 or of any one of the foregoing transmission screen and an additional front sheet. A rear projection display of the present invention is provided with the foregoing Fresnel lens sheet relating with the present invention or the foregoing transmission screen relating with the present invention.

Conventional elements may be added to the Fresnel lens sheet relating with the present invention provided that the Fresnel lens sheet is able to achieve the objects of the present invention.

EXAMPLES

Examples of the present invention will be described.

Example 1

A rear projection display in Example 1 having a screen size of 50 in. (aspect ratio: 4:3, 752 mm in height and 1062 mm in width), was provided with a Fresnel lens sheet (screen). A rear projection projector (light source) was disposed such that horizontal distance between the Fresnel lens sheet and the projector was 320 mm, vertical distance between a plane on which the projector is placed and the lower end of the screen was 220 mm, and image light fall on a central part of the screen at an incidence angle of 62°.

The Fresnel lens sheet was formed of an acryl-styrene copolymer in a thickness of 2 mm and was provided with prisms arranged at pitches of 0.11 mm. A 1 mm thick lenticular lens sheet (gain: 4, αH: 25°, αV: 8) was placed on the front surface of the Fresnel lens sheet. The lenticular lens sheet contained a light diffusing material, and was provided with vertical lenticular lenses arranged at pitches of 0.14 mm and having surfaces coated with a light-absorbing layer. A hanging member of 5 mm in thickness and 15 mm in height was attached adhesively to the upper side of the Fresnel lens sheet, and a hanging member of 7 mm in thickness and 15 mm in height was attached adhesively to the upper side of the lenticular lens sheet. The Fresnel lens sheet and the lenticular lens sheet were hung as shown in FIG. 9. The hanging members were formed of an acryl-styrene copolymer, and the lenticular lens sheet was formed of an acryl-styrene copolymer. Images displayed by the rear projection display were satisfactory and did not change even if environmental conditions were changed.

In the foregoing description, gain is calculated by using an expression: G=π×Luminance (cd/m$^2$)/Illuminance (lx), where G is gain, Luminance is the angular distribution of light projected on the screen from behind the screen and appearing on the front surface of the screen, and Illuminance is density of the luminous flux on the screen. Peak gain is a maximum gain on the screen. In this specification, peak gain is a maximum gain at the center of the front surface of the screen, αH is the half angle of the peak gain with respect to a horizontal direction and αV is the half angle of the peak gain with respect to a vertical direction.

Example 2

A rear projection display in Example 2 having a screen size of 60 in. (aspect ratio: 4:3, 914 mm in height and 1219 mm in width), was provided with a Fresnel lens sheet. A rear projection projector (light source) was disposed such that horizontal distance between the Fresnel lens sheet and the projector was 350 mm, vertical distance between a plane on which the projector is placed and the lower end of the screen was 293 mm, and image light fall on a central part of the screen at an incidence angle of 65°.

The Fresnel lens sheet was formed in 0.3 mm in thickness by forming prisms of a UV-curable resin on a 0.2 mm thick polyethylene terephthalate resin sheet.

A 5 mm thick lenticular lens sheet (gain: 4, αH: 25°, αV: 8) was placed on the front surface of the Fresnel lens sheet to form a transmission screen. The lenticular lens sheet contained a light diffusing material, and was provided with vertical lenticular lenses arranged at pitches of 0.14 mm and having surfaces coated with a light-absorbing layer.

A hanging member of 10 mm in thickness and 20 mm in height was attached adhesively to the Fresnel lens sheet. The Fresnel lens sheet was held streched as shown in FIG. 13. Five springs were connected to each of the upper, the lower, the right and the left end of the transmission screen to tension the transmission screen. Each of the springs was 8 mm in diameter and 20 mm in length, had a spring constant of 0.5 kg/mm. Each spring was stretched by 3 mm to apply a pulling force of 1.5 kg to the transmission screen. Thus a pulling force of 7.5 kg was applied to each of the upper, the lower, the right and the left end of the transmission screen. The hanging member was formed of a polycarbonate resin. The lenticular lens sheet was formed of an acryl-styrene copolymer and was placed on the exit surface of the Fresnel lens sheet.

Example 3

A rear projection display in Example 3 had the same optical system as the rear projection display in Example 1. The Fresnel lens sheet was formed in 0.6 mm in thickness by forming prisms of a UV-curable resin on a 0.5 mm thick polycarbonate resin sheet.

A 5 mm thick lenticular lens sheet (gain: 4, αH: 25°, αV: 8) was placed on the front surface of the Fresnel lens sheet to form a transmission screen. The lenticular lens sheet contained a light diffusing material, and was provided with vertical lenticular lenses arranged at pitches of 0.14 mm and having surfaces coated with a light-absorbing layer.

Six hanging members of 15 mm in thickness and 15 mm in height were attached adhesively to each of the upper and the lower side of the Fresnel lens sheet at intervals of 20 mm as shown in FIG. 14. Five compression springs were extended between the adjacent hanging members. Each of the compression springs was 10 mm in diameter and 25 mm in length, had a spring constant of 0.4 kg/mm. Each compression spring was compressed in a length of 22 mm to apply a pushing force of 1.2 kg to the hanging members. Thus a tension of 6 kg was applied to each of the upper and the lower side of the Fresnel lens sheet. The Fresnel lens sheet was hung. A support member of 5 mm in thickness and 15 mm in height was attached to the lower end of the exit surface of the Fresnel lens sheet to support a lenticular lens sheet thereon. The supported member was formed of a polycarbonate resin. The lenticular lens sheet was formed of an acryl-styrene copolymer.

Example 4

A rear projection display in Example 4 had the same optical system as the rear projection display in Example 1. A transmission screen was formed by combining a 0.5 mm thick Fresnel lens sheet and a 7 mm thick lenticular lens sheet.

Opposite lower corners of a rigid sheet were cut in slopes inclined at an inclination of 45° U-shaped hanging members were attached to the four corners of the Fresnel lens sheet, respectively. The inclination of a contact plane in which the lower surface of each hanging member and the upper surface of a support member are joined was 45°. The coefficient of static friction was 0.7.

As apparent from the foregoing description, the Fresnel lens sheet holding structure according to the present invention is capable of suppressing the warping of a Fresnel lens sheet and of insuring planarity even if the Fresnel lens sheet is as thin as 3 mm or below in thickness. Consequently, images displayed on the Fresnel lens sheet are scarcely distorted. The Fresnel lens sheet to be held by the Fresnel lens sheet holding structure can be easily released from a forming mold having a molding surface of a shape complementary to that of the Fresnel lens sheet and hence the Fresnel lens sheet can be efficiently manufactured.

The invention claimed is:

1. A Fresnel lens sheet holding structure for holding a Fresnel lens sheet of 3 mm or below in thickness having an entrance surface provided with prisms of a triangular cross section each having an entrance facet and a total-reflection facet that reflects part or all of light fallen on the entrance facet in a total-reflection mode to deflect the light in a desired direction, said Fresnel lens sheet holding structure comprising:

a hanging member to be attached to the upper side of the Fresnel lens sheet, a support member for supporting the hanging member, a tensioning member attached to at least the lower side of the Fresnel lens sheet, and a rigid sheet disposed adjacently to an exit surface of the Fresnel lens sheet, the rigid sheet mounted on the tensioning member, wherein joining planes in which the lower surfaces of parts of the hanging member corresponding to right and left end parts of the upper side of the Fresnel lens sheet and the upper surfaces of right and left end parts of the support member are joined are inclined such that a point specified by coordinates on the side of the end of the Fresnel lens sheet on the joining plane is at a level lower than that of a point specified by coordinates on the side of the center of the Fresnel lens sheet on the joining plane in a front elevation, and joining planes in which the upper surfaces of parts of the tensioning member corresponding to right and left end parts of the lower side of the Fresnel lens sheet and the lower surfaces of parts of the rigid sheet mounted on the tensioning member corresponding to the right and the left end part are joined are inclined such that a point specified by coordinates on the side of end of the Fresnel lens sheet on the joining plane is at a level higher than that of a point specified by coordinates on the side of the center of the Fresnel lens sheet on the joining plane in a front elevation.

2. The Fresnel lens sheet holding structure according to claim 1, wherein the tensioning member is pulled downward or laterally by an elastic member.

3. The Fresnel lens sheet holding structure according to claim 1, wherein the rigid sheet is a lenticular lens sheet.

4. The Fresnel lens sheet holding structure according to claim 1, wherein the Fresnel lens sheet has an exit surface provided with diffusing lenticular lenses.

5. The Fresnel lens sheet holding structure according to claim 1, wherein the Fresnel lens sheet contains a dispersing agent that diffuses light.

6. The Fresnel lens sheet holding structure according to claim 1, wherein the Fresnel lens sheet is colored to absorb light.

7. The Fresnel lens sheet holding structure according to claim 1, wherein the Fresnel lens sheet has a light absorbing layer.

8. The Fresnel lens sheet holding structure according to claim 1, wherein a low-reflection layer is formed on one of or both the surfaces of the Fresnel lens sheet.

9. A rear projection display provided with a transmission screen including the Fresnel lens sheet holding structure according to claim 1.

* * * * *